United States Patent [15] 3,700,813
Colman [45] Oct. 24, 1972

[54] TELEPHONING SYSTEM

[72] Inventor: Robert Colman, New York, N.Y.

[73] Assignee: General Alarm Corporation, New York, N.Y.

[22] Filed: Dec. 4, 1969

[21] Appl. No.: 879,963

Related U.S. Application Data

[62] Division of Ser. No. 587,589, Oct. 18, 1966, Pat. No. 3,519,745.

[52] U.S. Cl. ..................................179/5 P, 179/90 B
[51] Int. Cl. ..........................................H04m 11/04
[58] Field of Search .....179/2 DP, 2 R, 2 A, 5 R, 5 P, 179/90 AD, 90 B, 90 BD

[56] References Cited

UNITED STATES PATENTS

| | | | |
|---|---|---|---|
| 2,555,714 | 6/1951 | Talbot | 179/5 P |
| 3,400,378 | 9/1968 | Smith | 179/2 DP |
| 3,106,616 | 10/1963 | Flavan | 179/90 X BD |
| 3,549,810 | 12/1970 | Driscoll | 179/5 P |

*Primary Examiner*—Ralph D. Blakeslee
*Attorney*—Ward, McElhannon, Brooks & Fitzpatrick

[57] ABSTRACT

Automatic telephoning systems which include means for generating signals in response to the occurrence of ringback and busy signals following a dialing operation and means for controlling the operation of a message broadcast unit and of a call sequence unit in response to the generated signals.

30 Claims, 8 Drawing Figures

PATENTED OCT 24 1972 3,700,813

INVENTOR

ROBERT COLMAN

INVENTOR
ROBERT COLEMAN

INVENTOR

ROBERT COLMAN

INVENTOR.
ROBERT COLMAN

INVENTOR

ROBERT COLMAN

INVENTOR
ROBERT COLMAN

TELEPHONING SYSTEM

This is a division of copending application Ser. No. 587,589 filed Oct. 18, 1966, now U.S. Pat. No. 3,519,745.

This invention relates to telephoning systems and more particularly it concerns novel arrangements permitting the placement of telephone calls to selected locations for the remote signaling of various emergency situations.

A number of telephone alarm systems have been proposed in the past. However the versatility of such devices was limited in that they operated only in response to one or more predetermined emergency conditions; and their operation thereafter followed a set pattern irrespective of how the emergency was being responded to.

The present invention makes possible a far more versatile telephone alarm system than heretofore has been available. The alarm system of the present invention operates in response to one or several alarm situations and acts to place certain calls and to give certain messages, not merely in a programmed sequence, but rather in response to the manner in which the messages are being received. The telephone system of the present invention listens to busy and ringback signals, logically analyzes them in computer fashion and based upon the computed results, it directs its own remaining calls. Thus, for example, should a burglary be detected, the alarm system of the present invention will first place a call to the police. Immediately upon placing the call, it will broadcast a pre-recorded burglary alarm message for a certain length of time. As the first call is being placed however, the system will also listen for rings and/or busy signals; and, upon failure to complete its call (i.e. after the occurrence of a predetermined number of rings or busy signals,) it will stop broadcasting and will immediately sequence itself on to dialing a second call, for example, to a private agency or to the office of the proprietor of the establishment being burglarized. Here again, the device will respond to the occurrence of a predetermined number of rings or busy signals to override its own message broadcast. Should both of the first two calls be completed, the device will automatically reset itself. On the other hand, should either call not be completed, the device will sequence onto calling the telephone operator and deliver the message to her. Should even this call fail, the system will continue to redial the operator until she answers. Thereafter, the system will reset itself to a condition for responding to a new emergency or alarm situation.

In spite of the apparently complex operations and the self adaptive capability of the present invention to respond in different ways to different situations as they occur, the device is astonishingly simple in structural configuration. This structural simplicity has been achieved by making use of the voltages which occur on the telephone lines during the occurrence of ringback and busy signals. These voltages are counted and then used to perform certain triggering operations when a predetermined count is exceeded.

The present invention takes advantage of the fact that the ringback or busy signal count automatically stops when a call is completed. When this occurs, sequence triggering by count accumulation stops and sequence triggering by completion of the message broadcast is substituted.

The present invention effects in operation changes of its pre-programmed dialing sequence by noting and storing signals from its busy and ringback signal monitor and from its end of message monitor. These signals are representative of the non-completed and completed calls respectively. The signals are used to establish conditions (as by setting switches) to control the sequence of placement of subsequent calls. At the end of a full telephoning sequence, the system will reset itself to its initial condition.

According to further features of the present invention the telephone system is capable of being manually overridden at any time by picking up the telephone receiver and pressing a button. This will interrupt the prerecorded alarm message and allow a vocal message by the person using the device. This system also provides instant indication of the stage of its sequencing cycle. Moreover, the system is capable of providing automatic dialing to any desired numbers simply by pressing a button.

There has thus been outlined rather broadly the more important features of the invention in order that the detailed description thereof that follows may be better understood, and in order that the present contribution to the art may be better appreciated. There are, of course additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and are shown in the accompanying drawings, forming a part of the specification, wherein.

Figure 1:
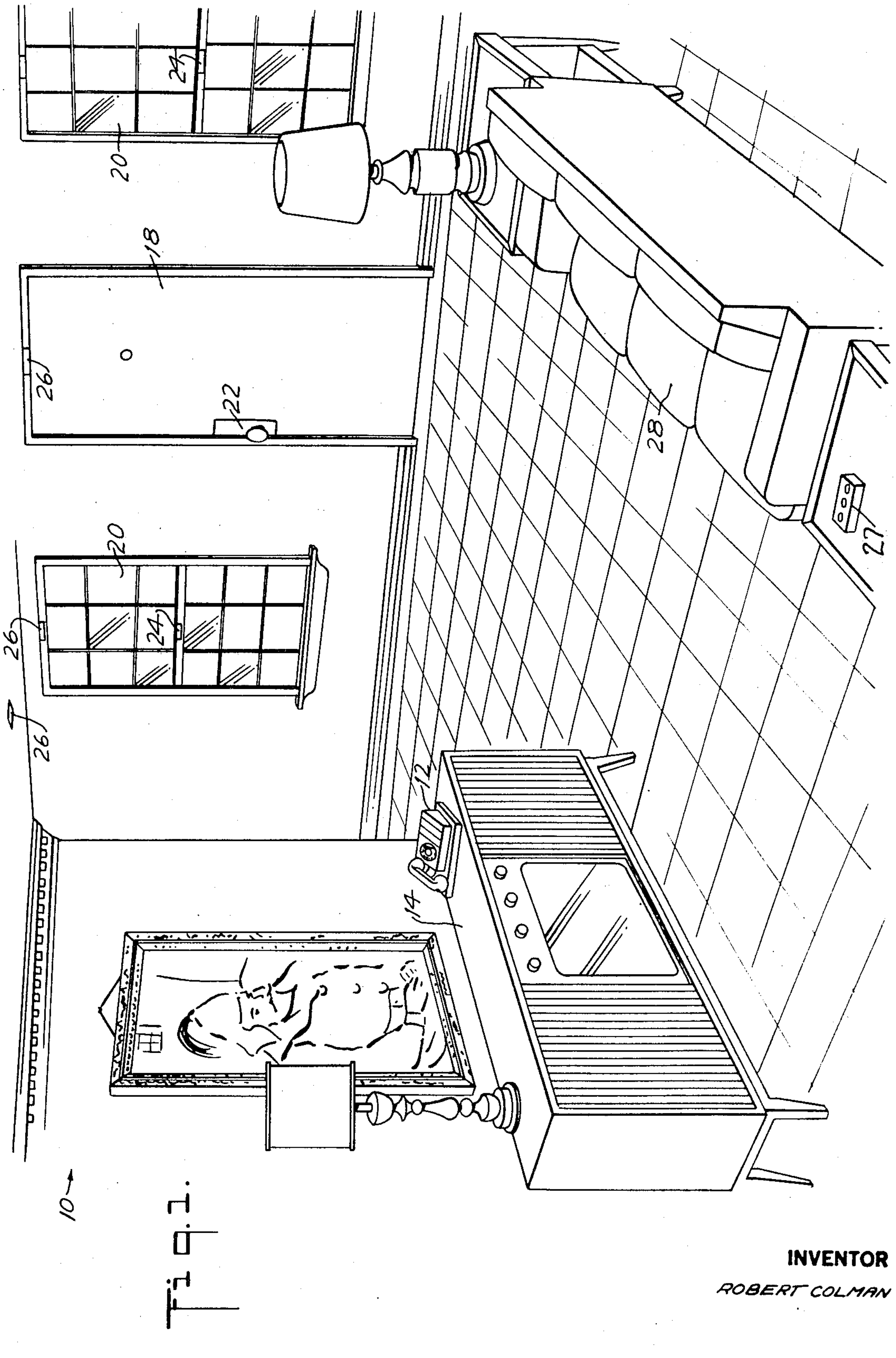
FIG. 1 is a diagrammatic representation of the interior of an apartment outfitted with a telephoning system according to the present invention and set up to signal fires and attempted burglaries.

As shown in FIG. 1, an apartment, illustrated generally at 10, is shown to be outfitted with various components making up the present invention. More specifically, there is provided a special telephone 12 which may be located in any convenient place, such as on the top of a television 14 or similar piece of furniture. The telephone 12 is integrally associated with a console portion 16 which contains the various operative units of the system.

The apartment 10 is provided with various closures such as a door 18 and windows 20. The door 18 is provided with a special door lock arrangement 22 which may be of the type shown and described in a copending U.S. patent application Ser. No. 568,546 filed July 28, 1966 and assigned to the assignee of the present invention. The special door lock arrangement 22 is characterized by the fact that it will respond to any unauthorized tampering or forcing of either the lock 22 or the door 18, and will thereupon close a switch to initiate operation of the telephone alarm of the present invention. There are also provided special window lock arrangements 24 which may also be of the type shown and described in a copending U.S. patent application, Ser. No. 568,546 filed July 28, 1966 and assigned to the assignee of the present invention. The special window lock arrangement 24, like the door lock arrangement 22 serves to lock its associated closure; and also like the door lock arrangement, the special window lock arrangement responds to unauthorized tampering or forcing of the lock 24 or the window 20, to initiate operation of the telephone alarm system.

There are additionally provided at strategic locations throughout the apartment 10, several fire and/or smoke detecting devices 26. These devices respond to the presence of heat and/or smoke and operate to close electrical switches located therein to initiate action of the telephone alarm arrangement. The lock arrangements 22 and 24 and the fire or smoke detection devices 26 are all connected by means of intra-wall wiring to the console portion 16.

Also as shown in FIG. 1, there is provided a remote console 27 located, for example, on or near a couch 28 or other piece of furniture. This remote console 27 is provided with various buttons 27*a*, 27*b* and 27*c* which can be pressed to initiate different operational sequences.

The system thus far described operates in the following manner. Should a burglary be attempted either by someone's forcing against the window 20 or the door 18, or by his tampering with their respective lock arrangements 24 and 22, then switches located within these locks will close and an appropriate signal will be supplied to the console unit 16. This in turn will operate to place a call to the local police station and to broadcast a message announcing the burglary and giving the address of the apartment. In the event that the police station does not answer the telephone call, the message will not be broadcast, but instead the system will automatically sequence to dial a second call to some other preselected number, such as a private agency; or perhaps, the owner's place of business. If the police station call was completed, then the system will wait until it repeats the alarm message to the police about three times before automatically sequencing to the second call. The second call is handled in the same manner as the first; that is, if the call is not completed the system will sequence immediately; but if the call is completed the system will again broadcast the alarm message about three times before sequencing.

If both of the first two calls are completed, the last sequencing will serve to reset the system to monitor a new emergency situation. On the other hand, if either the first or second call is not completed, the system will then place a call to the telephone operator and will play the alarm message to her. Following this last call, the system will automatically sequence back to its starting condition.

In the event that the emergency situation initiating operation of the system happens to be a fire, an initiating signal will be generated by one of the fire or smoke detecting devices 26. The system will then be actuated in a manner similar to that described above. However in the case of fire, the system will be switched automatically to place its first call to the fire department rather than to the police department. Additionally, the system will automatically switch itself to play a different message indicating to the person called that a fire has broken out in the protected premises 10. Otherwise, the sequencing will be the same as in the case of a burglary alarm situation, i.e. it will then call police, then a private agency or other number; and, in the event of an incomplete call, it will dial the operator.

Figures 2, 3:
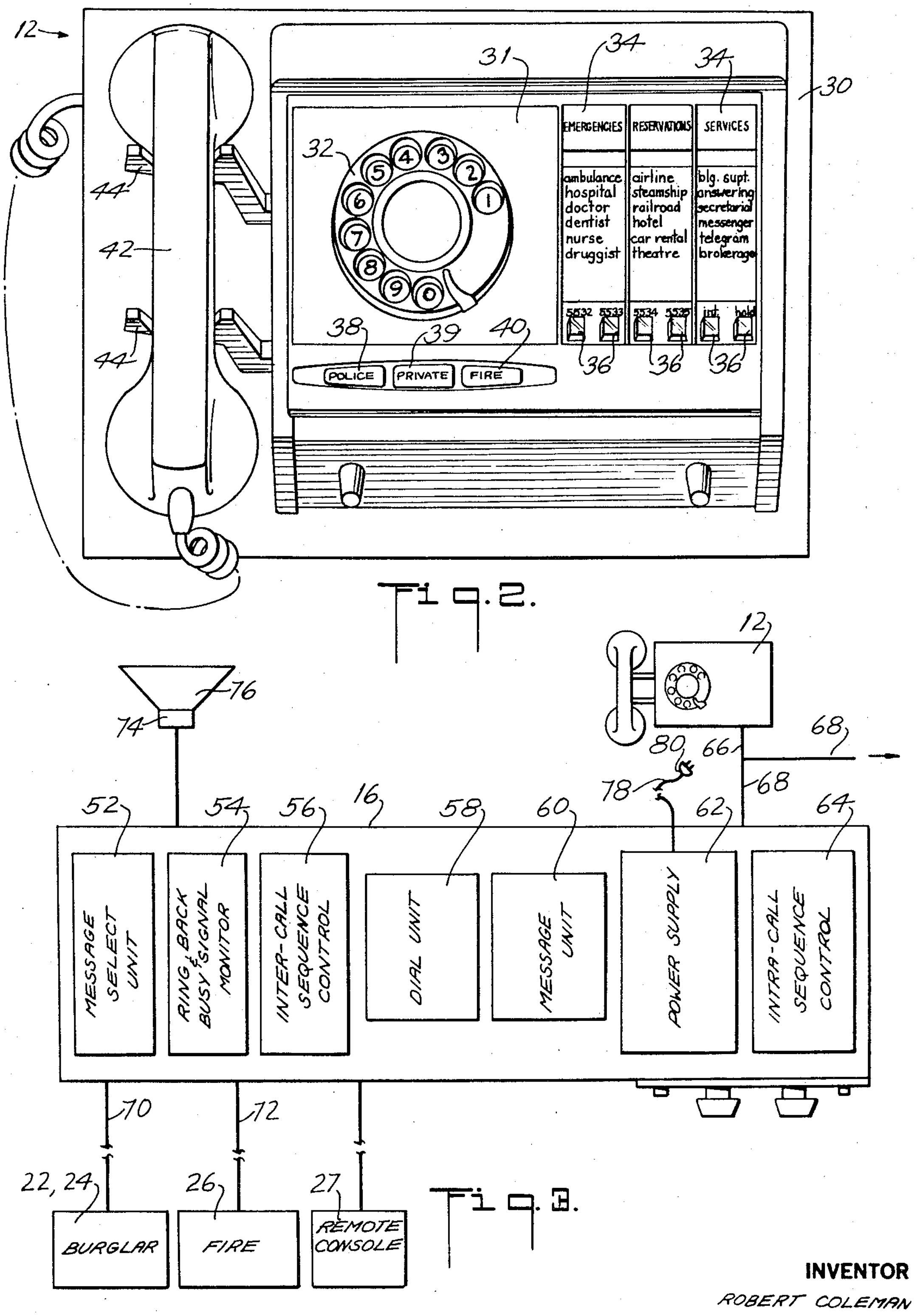
FIG. 2 is a top plan view of a telephone used in conjunction with the system of FIG. 1.
FIG. 3 is a block diagram representing a console unit used in connection with the system of FIG. 1.

Turning now to FIG. 2, it will be noted that the telephone 12 comprises a main cover 30 of generally boxlike configuration but having a sloping upper face 31. On this upper face, there is provided a conventional telephone dial wheel 32. Additionally, there are provided columns 34, each of which have listed thereon different groups of service facilities such as emergencies, reservations and miscellaneous services. At the bottom of each of the columns 34 there are provided two buttons 36 which, when pressed, will connect the user of the telephone 12 via a direct line to a service organization having ready access to each of the various items mentioned in the associated column. Thus, if the user of the telephone 12 should press one of the buttons 36 associated with the emergency column, he would immediately be connected with a service attendant who would be in a position to obtain the medical or other emergency service desired within the shortest amount of time. Similarly, by pressing the button 36 associated with the reservations column, the person using the telephone 12 would immediately be put in touch with a reservations agent who would be in a position to obtain for him the desired travel or other reservations.

There are additionally provided police, private agency and fire buttons 38,39 and 40 which, when pressed, will dial the police, a private agency or the fire department. This dialing, however, does not put the system into alarm message sequence but instead allows the user of the telephone to speak to the number called to give any other message he desires. The buttons 38,39 and 40 are provided with individual illumination which operates during the automatic sequencing. As each particular call is being placed during the automatic sequence, the button corresponding to the number being called will light up and will stay lit until the sequence is complete. Thus by merely observing the buttons, it is possible to ascertain which call in a sequence is being made at any given instant.

The telephone 12 is additionally provided with a handset 42 which rides on cradle arms 44 and which is utilized in the manner of a conventional telephone handset. A handset wire 46 connects the handset 42 to the telephone unit 12 as in a conventional telephone. The handset 42 is provided with a button 47 which when pressed, disconnects the output of the prerecorded message so that the user may talk directly with the party being called. The manner in which this manual override operates will be described more fully hereinafter.

Turning now to FIG. 3, it will be seen that the console portion 16 is made up of a plurality of sub-units, known respectively as the message select unit 52, the ring back and busy signal monitor 54, the inter-call sequence control 56, the dial unit 58, the message unit 60, the power supply 62 and the intra-call sequence control 64. As illustrated, the telephone unit 12 is connected by means of a telephone wire 66, to an incoming telephone line 68. Additionally, the telephone line 68 is connected to the console portion 16. As shown in FIG. 3, the burglary and fire detecting devices 22, 24 and 26, and the remote control console 27 are connected by means of lines 70 and 72 to the console portion 16. Additionally, there is provided a local alarm 74 with its own loudspeaker 76 to provide loud acoustical signals in the protected premises 10 itself, in order to frighten away an unauthorized intruder or to notify persons within hearing distance that an emergency condition exists in the protected premises 10. As shown, the power supply 62 is connected by means of a cord 78 to a plug 80 which may be plugged into any convenient 110 volt AC receptacle for supplying alternating current to the system itself.

Of the various units making up the console 16, all but the message unit 60 and the dial unit 58 are made up solely of electromagnetically operated switches and associated electrical components and interconnections. These electrical arrangements will be described in conjunction with FIG. 7. The message and dial units however have additional mechanical features which will first be described in conjunction with FIGS. 4 and 5.

Figure 4:
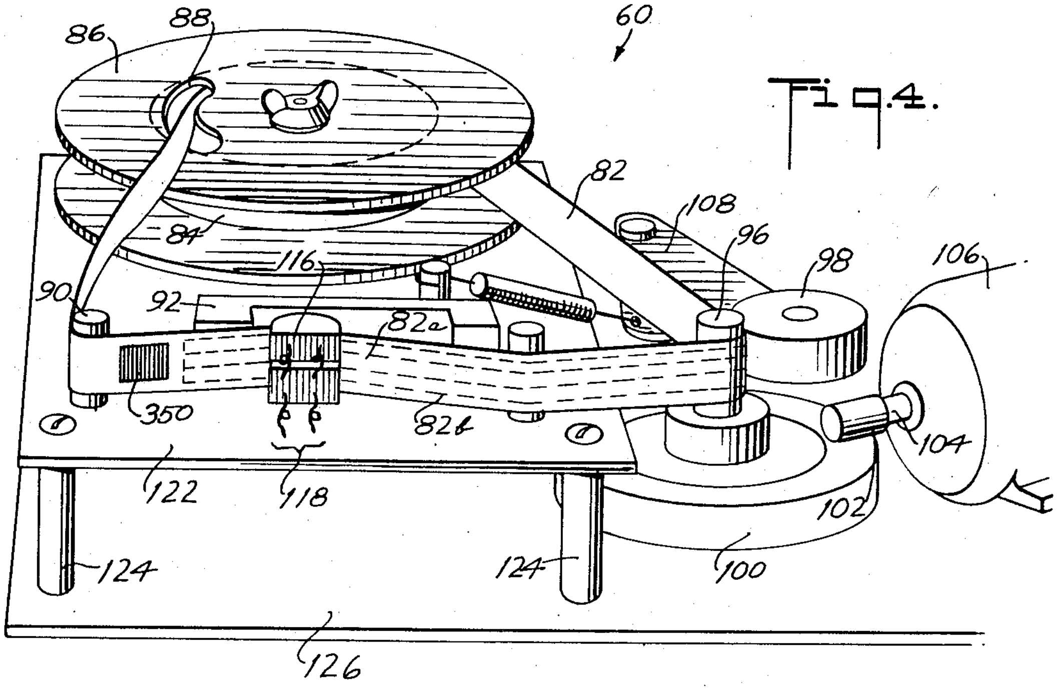
FIG. 4 is a perspective view showing the mechanical arrangements of a message unit used in the console of FIG. 3.

As shown in FIG. 4, the message unit 60 includes an endless loop of magnetic recording tape 82 which is coiled around a tape supply spool 84. The spool 84 in turn is mounted within a tape cartridge 86. The tape 82 is withdrawn from the inner turn of its coil on the tape supply spool 84. It proceeds out through a slot 88 in the cartridge 86 and around a first guide capstan 90. The tape 82 then moves past a play back head arrangement 92, around a second guide capstan 94, through the nip of a drive capstan 96 and a corresponding drive roll 98, and back onto the outside turn of the tape supply spool 84. The drive capstan 96 is mounted to turn with a wheel 100 which in turn is rotatably driven by a friction roll 102 attached to the drive shaft 104 or armature of a tape drive motor 106. As the motor drive shaft 104 turns the friction roll 102, the friction roll in turn rotates the wheel 100, causing the drive capstan 96 to rotate. In the meantime, the drive roll 98, which is mounted on a pivot arm 108, is forced against the tape 82 and drive capstan 96 by the action of a bias spring 110 connected between the arm 108 and a stationary post 112. This assures sufficient frictional engagement with the tape 82 so that the motion imparted by the drive motor 106 causes the tape to move at a substantially constant speed past the playback head arrangement 92.

The playback head arrangement 92 includes a pair of pickup heads 114, 116 which serve to produce electrical signals corresponding to the magnetic configurations in the portions of the tape which pass in front of the head. The tape 82 in the present case is prerecorded along separate upper and lower tracks **82*a* and 82*b*, each of which contains a different message. In the present situation, the upper track contains information to be broadcast in the event of a burglary. The message therefore is one which announces a burglary. On the other hand, the lower track is recorded to announce a fire, and it will supply an appropriate message corresponding to the announcement of a fire. The two pickup heads 114 and 116 are each located to pick up the message on a different one of the recorded tracks on the tape 82**. The electrical signals representing these messages are thereafter transmitted for broadcast over telephone lines to the dialed number in a manner to be described.

As shown in FIG. 4, the endless tape cartridge 86 and spool 84 are mounted together with the guide capstan 90 and 94 and the playback arrangement 92 on a mounting board 122 which is supported by means of legs 124 on a baseboard 126. The wheel 100 and its associated drive caps 96 are mounted to rotate on the baseboard 126. Additionally, the tape drive motor 106 is also mounted on the baseboard 126.

Figure 5:
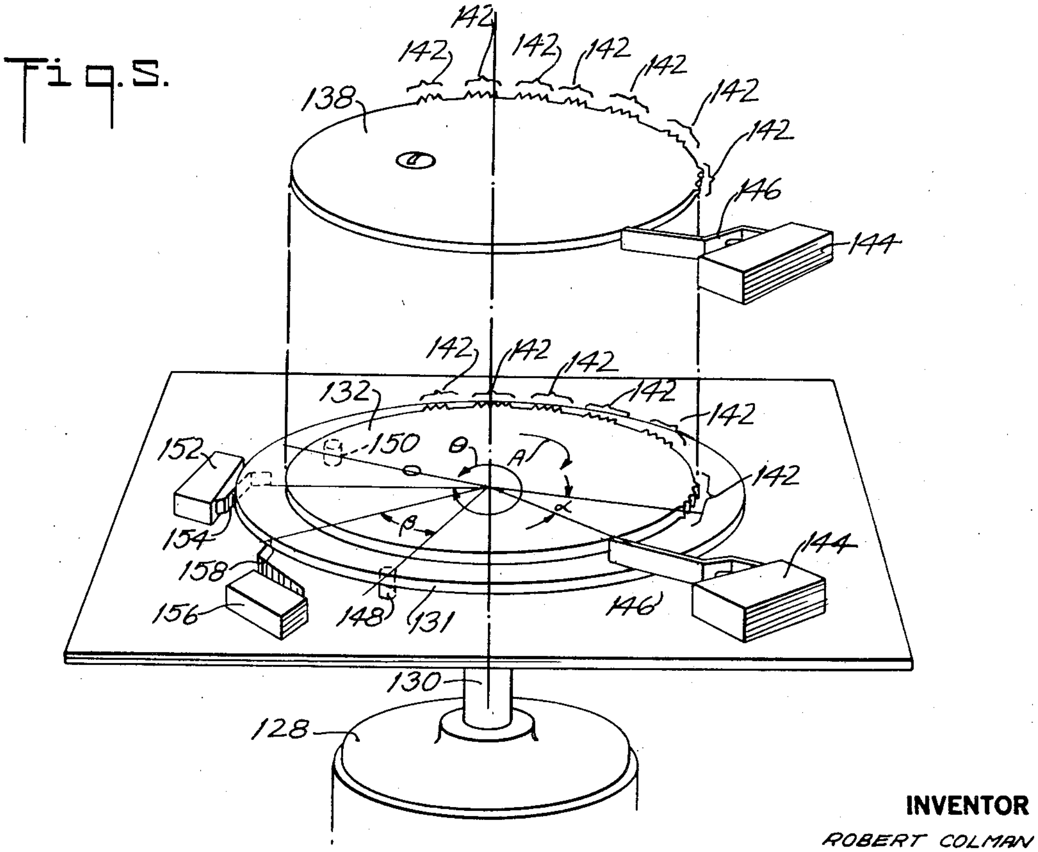
FIG. 5 is a perspective view illustrating a portion of a dial unit used in the console of FIG. 3.

The mechanical configuration of the dial unit 58 is shown in FIG. 5. Essentially, this unit comprises an electrically powered dial motor 128 which turns a shaft 130 upon which are mounted a plurality of dial code disks 132, 134, 136 and 138, arranged in stacked array. (Only the upper and lower disks 132 and 138 are actually shown in FIG. 5, the others being represented only by phantom lines, since in its broader aspects, the invention may utilize any number of seprate code disks.) The code disks are each of substantially the same diameter and are provided about their peripheries with groups of toothed projections 142. The number of projections in each group corresponds to a digit to be dialed. That is, if the digit to be dialed is the number 8, then the associated group will contain eight projections. The various groups of projections 142 on each wheel are distributed according to a particular telephone number to be called by the wheel. Thus, for a seven digit telephone number, there will be seven groups of toothed projections, each group containing a number of projections equal to that of the associated digit in the telephone number which that group represents.

There is fixedly mounted in association with each of the dial code disks 132–138 an associated dial switch 144 having a switch arm 146 which engages the periphery of its associated code wheel so as to be moved in and out by passage thereby of the toothed projections in the various groups 142 as the associated code disk revolves. The dial switches 144 are single pole, single throw open-close switches which are in normally closed condition but which are opened by the passage of each projection under their associated switch arms 146. Thus, as each code disk rotates past its dial switch 144, the switch will be opened and closed a number of times corresponding to a number of projections in each of the groups 142. As will be noted, the various groups of toothed projections 142 are arranged such that a complete telephone number dialed in one revolution of the code disks 132–138.

A pair of switch trip pins 148 and 150 are arranged to turn with the code disks 132–138. These pins are shown to extend downwardly under a code disk support plate 151 which supports and turns the code disks 132–138. It will be appreciated that the pins 148 and 150 is each capable of engaging an associated switch arm once each revolution of the disks. There is provided a message motor start switch 152 having a switch arm 154 arranged to be engaged by the first pin 148 when the code disks reach a first predetermined rotational position. ADditionally, there is provided a rotational control switch 156 arranged with a switch arm 158; which is engaged by the second pin 150, when the code disks reach a second predetermined rotational position. The effect of the operation of the dial switches 144, the message motor start switch 152 and the rotational control switch 156 will be described in connection with the wiring schematic of FIG. 7.

Figure 6:
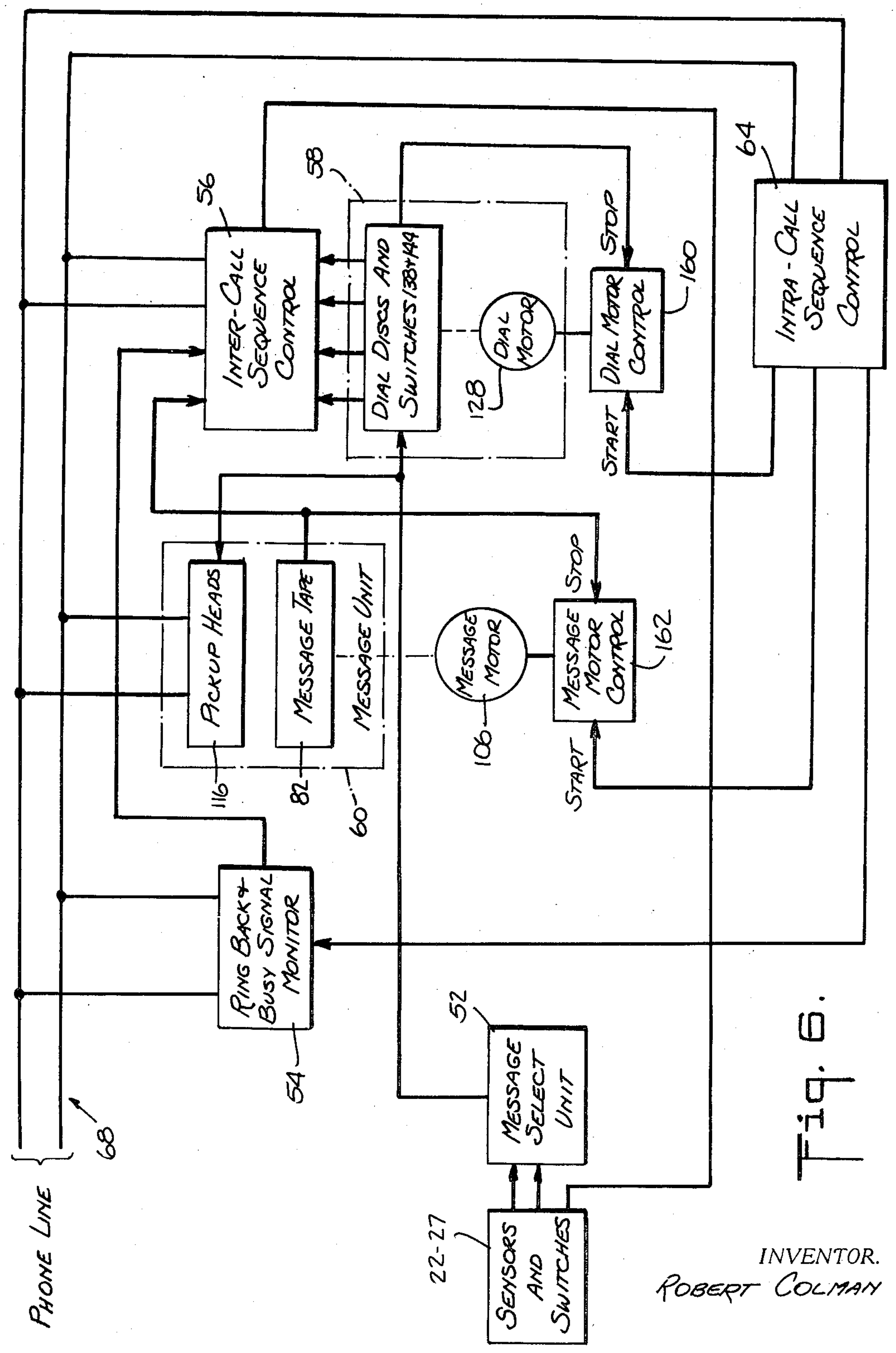
FIG. 6 is a block diagram illustrating the overall functional relationship and the basic interconnections between the various elements making up the system of FIGS. 1–5.

FIG. 6 illustrates the overall functional relationship and the basic interconnections between the various elements making up the console 16. As can be seen in FIG. 6, the sensors and switches 22, 24, 26 and 27 are connected to the message select 52 as well as to the input of the intracall sequence control 64. When one of the sensors detects an alarm condition, it sends an appropriate signal to the message select unit 52 depending on whether the situation calls for a fire alarm or a burglary alarm. The message unit 52, as shown in FIG. 6, is connected to the pick-up heads 116 in the message unit 60 to select the head which is arranged to broadcast the appropriate message for the particular condition, e.g., fire or burglary, which has been detected. At the same time, a signal is supplied from the message select unit 52 to the dial unit 58 in order to select, for dialing, the dial discs 138 which is coded to the desired number to be called for the particular situation which has been detected. Another signal is also supplied from the sensors and switches to the intra-call sequence control 64, thereby causing this unit to initiate a preprogrammed sequence of signals which control the placing of the first of several successive telephone calls to be made. The intra-call sequence control 64 first produces a signal which starts the dial motor 128. In the specific arrangements to be described in connection with FIGS. 7 and 8, the dial motor 128 and the message motor 106 are controlled by means of various switches within the inter-call sequence control 56 and the intra-call sequence control 64. However, in order to permit a more simple description of the overall operation of the system, there is shown in FIG. 6 a dial motor control circuit 160 and a message motor control circuit 162. The dial motor control 160 receives a start signal from the intra-call sequence control 64 to begin the placement of a call. This starts the dial motor 128 causing it to turn the dial discs 138. Depending upon the particular dial disc switch selected by the message unit 52, a particular sequence of dialing signals will be passed through the inter-call sequence control 56 to the telephone line 68 to achieve dialing. At the completion of this dialing, a signal is sent back from the dial discs to stop the dial motor 128. Thereafter, a further signal is sent from the intra-call sequence control 64 to the start terminal of the message motor control 162. This has the effect of starting the message motor 106 which in turn drives the message tape 82. While the message tape 82 moves, one of the pickup heads 114 or 116, as selected by the message select unit 52, produces signals corresponding to the selected track of the message tape 82 and broadcasts these signals over the telephone line 68. At the end of the message a signal is sent back from the message tape 82 to stop the message motor 106.

Following the dialing operation, the intra-call sequence control 64 supplies a signal to the ringback and busy signal monitor 54, thereby conditioning it to respond to ringback and busy signals which may be present on the telephone lines 68 following the dialing operation. Should the called telephone fail to answer, either because it is busy or for any other reason, a number of ringback or busy signals will accumulate in the ringback and busy signal monitor 54. When a predetermined number of these signals have accumulated, a signal is applied to the inter-call sequence control 56 and from the inter-call sequence control 56 back around to the intra-call sequence control 64, thereby causing it to reset and begin the placement of a new call. The effect of the signal from the ringback and busy signal monitor 58 on the inter-call sequence control 56 is to change the sequence of dialing, that is, to cause it to rearrange the sequence of numbers to be called by adjusting the switching of the various dial switches 144 into the telephone line 68.

If the called number answers before the accumulation of the predetermined number of ringback and busy signals, then the system will not begin the placement of a subsequent call but instead will allow the message unit 60 to broadcast over the telephone line 68. At the completion of this message, a signal is applied to the inter-call sequence control 56 causing it to initiate a subsequent call.

While the various units making up the console 16 are electrically interconnected to interact with one another a considerable degree, nevertheless, in the interest of clarity of presentation, each of these various units will be described individually.

THE POWER SUPPLY UNIT

The power supply unit 62 serves to produce a 110 volt AC electrical power over a pair of 100 volt supply lines 200 and 202. The unit also serves to supply a 24 volt DC electrical power over a 24 volt DC supply line 204. The power supply unit 62 receives electrical input power via the plug 80 and the input line 78. The input line 78 comprises two branches 206 and 208 which are connected respectively to the 110 volt AC output lines 200 and 202. A fuse 210 is connected into the branch 208 to protect the system. The primary of a voltage reduction transformer 212 is also connected across the two branches 206 and 208 within the power supply unit 62. The secondary of the transformer 212 is connected between ground and the DC supply line 204. A diode 214 is connected in series with the secondary of the transformer 212 and a smoothing capacitor 216 is connected across the secondary of the transformer 212 in order to provide half wave rectification for production of the DC voltage output of the transformer.

There is additionally provided a DC reset switch 218 in the DC supply line 204. This DC reset switch is operated by a reset relay 220 which opens the switch 218 momentarily upon the reception of reset voltages via a reset line 222.

A capacitor 224 and a resistor 226 are connected in parallel with each other; and together they are connected in series along the reset line 222 in order to insure that voltages applied to the relay 220 will be only a momentary duration so that the switch 218 will open and reclose immediately.

THE ALARM START CONNECTIONS

As indicated previously, the sequence of operations by which various telephone calls are placed to signal the occurrence of an emergency situation, may be initiated by actuation of either the special door lock arrangement 22, the special window lock arrangement 24, the various fire and/or smoke detecting devices 26 or by the depression of the police or fire button 27*a* or 27*b* on the remote console 27.

Figure 7:
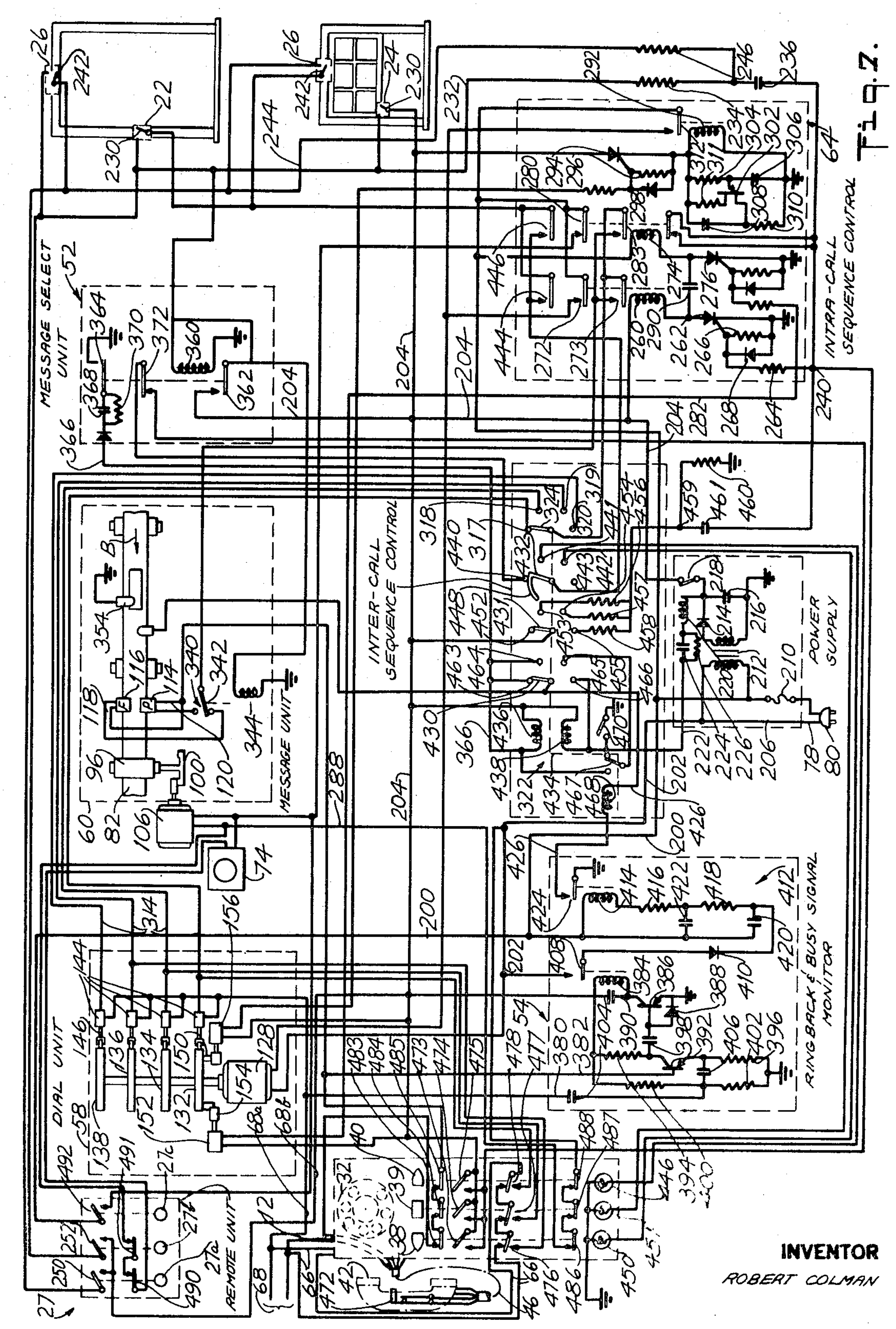
FIG. 7 is a wiring diagram illustrating the electrical interconnections making up the system of FIGs. 1–6.

As shown in FIG. 7, the special door lock arrangement 22 and the special window lock arrangement 24 are each provided with a normally opened electrical switch 230. This switch becomes closed when the door or window is tampered with; and when the switch closes, it connects the 24 volt DC supply line 204 to a burglar alarm start line 232 so as to supply positive DC voltage potential via a limiting resistor 234, a pulse capacitor 236, and a normally closed relay contact 238 to an initiate terminal 240 leading into the intra-call sequence control unit 64. Additionally, the fire and/or smoke detecting devices 26 are each provided with an associated normally opened electrical switch 242. This switch becomes closed when the device 26 detects fire or smoke; and when the switch closes, it connects the 24 volt DC supply line 204 to a fire alarm start line 244 for supplying the positive DC voltage via a second limiting resistor 246 through the capacitor 236, and the relay contacts 238 to the initiate terminal 240. The burglar alarm start line 232 which receives alarm start voltages by closure of the door switch 230, is also connected via a message select unit line 248 to the message select unit 52 so as to cause this unit to select a burglar alarm message rather than a fire alarm message and to place its initial call to the police department instead of to the fire department.

In addition to the automatic actuation of the alarm system by closure of either the fire detection switches 242 or the burglar detection switches 230, the system may be actuated manually by depression of either the police button 27*a* or the fire button 27*b* on the remote console 27. As shown in FIG. 7, these two buttons are connected respectively to operate associated normally opened fire and police switches 250 and 252. These switches, when closed, serve to connect the 24 volt DC supply line 204 to either the fire or burglary alarm start line 232 or 244, according to the particular button which has been depressed.

THE INTRA-CALL SEQUENCE CONTROL UNIT

The purpose of the intra-call sequence control unit 64 is to program and control the sequence of operations which occur during the placement of each telephone call. As shown in FIG. 7, the intra-call sequence control unit 64 includes a first relay coil 260 which is connected between the 24 volt DC supply line 204 and the anode of an SCR 262 (otherwise known as a silicon controlled rectifier or a thyristor). The cathode terminal of the SCR 262 as shown is connected to ground. The initiate terminal 240 is connected via a third limiting resistor 264 to the control electrode of the SCR 262. The control electrode and cathode of the SCR 262 are bridged by a further resistor 266 and a diode 268. Upon application of a positive DC potential to the initiate terminal 240 current will flow into the control electrode of the SCR 262, placing it into a conductive condition; whereupon current will flow directly from the 24 volt DC supply line 204 through the first relay coil 260 to energize the coil. The coil 260, when energized, serves to close a pair of normally opened dial motor control contacts 270; and this in turn connects the first 110 volt AC supply line 200 through a dial motor control line 272 to one input terminal of the dial motor 128. The other input terminal of the dial motor 128 is connected directly to the other 100 volt AC supply line 202. Energization of the coil 260 also serves to close a pair of normally open "on-hook" relay contacts 273. This closes the circuit involving the telephone lines 68 so that the system is put in condition to place a call. Closure of this circuit also serves to signal the telephone exchange that a call is going to be placed so that the exchange will produce a dial tone.

There is additionally provided within the intra-call sequence control unit 64, a second relay coil 274 which is connected between the 24 volt DC supply line 204 and the anode of a second SCR 276. The cathode of the second SCR 276 is connected to ground, while its control electrode and cathode are, like the first SCR 262 bridged by a resistor 278 and a diode 280. The control electrode of the second SCR 276 is connected to a message initiate line 282 which in turn is connected by the normally opened message motor start switch 152 to the 24 volt DC output line 204. When the message motor start switch 152 is closed by movement of the lug 148 against the switch arm 154, the positive voltage from the line 204 is supplied to the control electrode of the second SCR 276 causing the SCR to conduct so that current will flow through the second relay coil 274.

There are also provided a pair of normally opened "on hook" relay contacts 283 which are closed by energization of the second relay coil 274. These "on hook" contacts are connected in parallel with the "on hook" contacts 273 so as to maintain the system in an "off-hook" or call condition even though the first relay coil 260 becomes de-energized.

The second relay coil 274, when energized, also serves to open a set of normally closed alarm inhibit relay contacts 238 and at the same time to close a set of normally opened message motor control contacts 284. Opening of the alarm inhibit contacts 238 prevents the application of further initiate pulses to the initiate terminal 240 from the door and window locking devices and from the firs and/or smoke detecting devices 26, until after the system has completed its entire operational sequence. This inhibiting action prevents the system from being foiled by a burglar restarting the alarm before it completes its alarm broadcast.

Closure of the contacts 284 by the second relay coil 274 serves to connect the first 110 volt AC supply line 200 to a message motor control line 286. The message motor control line 286 is connected to one terminal of the tape drive motor 106. The other motor terminal meanwhile is connected via a local alarm line 288 through the local alarm 74 to the other 110 volt AC supply line 202. Thus, it will be seen that when the second relay coil 274 is energized to close the normally opened message motor control contacts 284, the tape drive motor 106 and the local alarm unit 74 are connected in series across the 110 volt AC output lines 200 and 202. Thus, simultaneously with the driving of the tape 82 and broadcast of an alarm message over the telephone lines 68, there will occur the generation of the local alarm signal.

The anodes of the first and second SCR's 262 and 276 are interconnected by means of a capacitor 290 which serves to communicate the decreasing voltage which occurs at the anode of one SCR when it is turned on, over to lower the anode voltage of the other SCR, so that if such other SCR was conducting at that time, this lowering of its anode voltage will terminate its conduction thereby deenergizing its associated relay coil. It will thus be appreciated that the first relay coil 260 along with its associated relay contacts 270 operates in alternate sequence with the second relay coil 274 and its associated relay contacts 284 and 238.

The intra-call sequence control unit 64 is provided with a third relay coil 292 which is connected between ground and the cathode of a third SCR 294. The anode of the third SCR 294 is connected to the 24 volt DC supply line 204. As with the first and second SCR's 262 and 276, the third SCR 294 has its control and cathode electrodes bridged by a resistor 296 and a diode 298. The control electrode of the third SCR 294 is connected via a dial control line 300 to the dial control switch 156, which in turn serves to connect the control electrode of the third SCR 294 to the 24 volt DC supply line 204. Thus when the control arm 158 of the switch 156 is moved by the pin 150, the switch 156 connects the 24 volt DC supply line 204 through the dial control line 300 to the control electrode of the third SCR 294, causing the SCR to go into its conductive state and thereby energizing the third relay coil 292.

A monostable timing unit is placed across the third relay coil 292. This timing unit comprises a uni-junction transistor 302, the emitter of which is connected at the junction point of a resistor 304 and a capacitor 306 which are connected in series across the coil 292. One of the base terminals of the uni-junction transistor 302 is connected to the junction point of a further capacitor 308 and a further resistor 310 which are also connected across the terminals of the relay coil 292, but in opposite arrangement with respect to the resistor 304 and the capacitor 306. The other base terminal of the uni-junction transistor 302 is connected via another resistor 311 to the cathode terminal of the third SCR 294.

The action of the mono-stable timing circuit just described is such as to allow the third SCR 294 to remain conductive for a predetermined duration depending upon the values of the various capacitors and resistors making up the circuit. These values are chosen such that the third SCR 294 will remain conductive for a period of time following the movement of the pin 150 on the code disks 132–138 past the switch control arm 158 such that the code disks will undergo one complete rotation following the energization of the dial motor 128.

The third relay coil 292, when energized, closes a pair of normally opened dial motor control contacts 312 which are arranged in parallel with the normally opened dial motor contacts 270 operated by the first relay coil 260. Thus once the coil 292 is energized to control its relay contacts 312, the dial motor 128 will continue to receive 110 volt AC energization even though the first relay coil 260 becomes de-energized to open its associated contacts 270.

The operation of the intra-call sequence control unit 64 to place a telephone alarm call in response to an emergency condition or the depression of one of the telephone buttons 38 and 40 will now be described.

As stated previously, when any of the above mentioned alarm initiating situations occur, a finite voltage is applied to the initiate terminal 240 of the intra-call sequence control unit 64. This in turn places the first SCR 262 in a conductive state, thereby energizing the first relay coil 260. As a consequence, the dial motor 128 is placed across the 110 volt AC supply line 200 and 202, causing it to begin rotation. The dial motor 128 is arranged to turn at a rate of approximately 4 RPM or one revolution every 15 seconds. At the instant the dial motor 128 is energized, its associated code disks 132–138 are arranged in the angular position shown in FIG. 5. In this position, it will be noted, the switch arms 146 of the dial switches 144 are displaced at an angle $\alpha$ from the first of each group of toothed projections 142 on its associated code disk. The angle $\alpha$ is chosen to be approximately 14° so that it will take about 3.5 seconds from the initiation of rotation of the code disk until the first group of toothed projections 142 begin to operate the associated dial switch 144. The purpose for this is to achieve sufficient time after the occurrence of an off-hook condition (produced by closure of the contacts 273), to provide a dial tone indicating that the telephone exchange is ready to accept the placement of a call before actual dialing begins.

As the dial motor 128 turns the code disks in the direction of the arrow A as shown in FIG. 5, pin lug 148, will come into contact with the arm 158 of the rotational control switch 156 soon after dialing has started. Actually, the pin 148, as shown, is disposed an angular distance $\beta$ from the initial starting position of the code disks. The angle $\beta$ is chosen to be approximately 20°, so that the switch 156 is operated at about 5 seconds after the code disks begin to turn or within about 1.5 seconds after dialing begins.

Operation of the rotational control switch 156, as stated previously, serves to apply a positive DC potential to the control electrode of the third SCR 294 to energize its associated relay coil 292, thereby closing the contacts 312 to maintain the dial motor 128 energized for a duration corresponding to the timing characteristic of the monostable circuit connected in parallel with the coil 292. This timing characteristic is chosen to be in the neighborhood of 10 seconds so that at the time the coil 292 becomes de-energized to open the switch contacts 312 and stop operation of the dial motor 128, the code disks will once again be at their initial position. Thus, it will be appreciated that the application of a start voltage at the initiate terminal 240 will serve to cause the dial motor 128 to rotate its associated code disks 132–138 through one complete revolution; and further, during such rotation, dialing will not start until sufficient time for a dial tone to occur has elapsed, (i.e. about 3.5 seconds). Thereafter, one complete telephone number will be dialed; and upon the completion of this the code disks 132–138 will be at their initial position.

At a time shortly preceding the completion of a dialing operation as above described, the pin 150 will engage the arm 154 of the message motor start switch 152 thereby closing the switch and placing the message motor 106, as well as the local alarm 74 across the 110 volt AC supply lines 200 and 202. This action occurs by the switch 152 connecting the 24 volt DC supply line 204 to the message initiate line 282, thereby applying a finite current to the control electrode of the second SCR 276. This switches the SCR into its conductive state. As a result the second relay coil 274 energizes and closes the switch contacts 284 to place the message motor 106 and the local alarm 74 across the 110 volt AC supply lines 200 and 202. Additionally, it will be noted that the energization of the relay coil 274 to start the message motor 106 also serves, as above explained, to de-energize the first relay coil 260 since the decrease in voltage which occurs at the anode of the second SCR 276 is communicated via the capacitor 290 to the anode of the first SCR 262 thereby causing the first SCR 262 to cease conducting. The resulting de-energization of the first relay coil 260 allows its associated contacts 270 to open thereby placing the operation of the dial motor 128 under the complete control of the contacts 312 of the third relay coil 292 so that the dial motor 128 will be stopped immediately upon the end of the timing period of the monostable circuit associated with the third relay coil 292.

The message motor 106 will continue to operate to drive the tape 82 until the relay 274 becomes deenergized in one way or another as will be explained hereinafter.

THE DIAL UNIT

The purpose of the dial unit 58 is to effect the simultaneous dialing of a plurality of telephone numbers. Any number of telephone numbers may be dialed by the dial unit 58 depending upon the number of code disks 132–138 which are employed. Each of the code disks 132–138 is provided with its own associated dial switch 144 which is simply a normally opened switch adapted by the action of the toothed projections 142 on the periphery of the associated code disks as these toothed projections pass by the arm 146 of the associated dial switch 144. In the illustrative situation, the four code disks 132, 134, 136 and 138 are programmed respectively to call:

a. the Police Department,
b. the Fire Department,
c. a private agency; and
d. the telephone operator.

All of the code disks rotate simultaneously and cause each of their respective dial switches 144 to effect dialing of a different number. Actually, only one of the various numbers dialed is used in the placement of a specific call. As shown in FIG. 7, one terminal of each of the switches 144 is connected to one branch 68*a* of the telephone lines 68. The other terminal of each of the switches 144 is connected via an associated dial line 314 to a corresponding terminal 317, 318, 319 and 320 of a stepping switch 322 in the intra-call sequence unit 56. The terminals 317, 318, 319 and 320 are contacted sequentially by a third stage wiper arm 324. The wiper arm 324 in turn is connected through the "off-hook" contacts 273 and/or 283 in the intra-call sequence control 64 and through one or the other of the pickup heads 114 and 116 in the message unit 60 to the second branch 68*b* of the telephone lines 68. Thus, depending upon the particular position of the stepping switch 322, a different one of the switches 144 will be placed into the telephone line circuit to open and close the circuit according to the grouping of its associated code disk toothed projections 142. Such timed intermittent opening and closing of the telephone line effects dialing of a particular telephone number.

In the present case, the system is arranged such that in the event of a fire, it will dial the fire department, then the police department, then a private agency or other private number; and, in the event of any incompleted call, it will dial the operator. In the event of a burglary the call to the fire department will be omitted; otherwise the above sequence will be followed, although a different message will be broadcast.

THE MESSAGE UNIT

The purpose of the message unit 60 is to drive the tape 82 through a complete circuit while playing one or the other of the messages contained on the tape. As explained above, the tape drive motor 106 in the message unit is started by energization of the second relay coil 274 in the intra-call sequence unit 64. As the tape 82 moves in the direction of the arrow B as shown in FIG. 7, the magnetic configurations contained in the two tracks along the length of the tape will be monitored by the two pickup heads 114 and 116. As shown in FIG. 7, there is provided a message select switch 340 having a common movable contact 342 connected to the wiper arm 324 of the stepping switch 322 in the inter-call sequence control unit 56. Normally, the common movable contact 342 is in its lowermost position connecting the lines 118 of the fire message pickup head 116 across the branches 68*a* and 68*b* of the telephone line 68 in series with the stepping switch 324 and one of the dial unit switchs 144. The movable contact 342 of the message select switch 340 is moved to its opposite position by energization of a message control relay 344 which is energized by the receipt of finite voltages from a burglary select line 345. With the switch 340 in this energized condition, the fire pickup head 114 is disconnected from the telephone line 68 and the burglary message pickup head 116 is substituted in its place.

The tape 82 is pre-recorded along each of its tracks 82*a* and 82*b* with a fire or a burglary message somewhat as follows:

FIRE MESSAGE:

"Attention-Attention-Attention. A fire has broken out at 1234 Main Street."

BURGLARY MESSAGE:

"Attention-Attention-Attention. A burglary is in process at 1234 Main Street."

Each of the above messages is repeated three times or more about one complete loop of the tape 82 so that as the tape 82 is driven through a complete circuit, the particular message being broadcast will be repeated a corresponding number of times, to ensure that the listener being called has ample opportunity to note the particulars of the message.

As shown in FIG. 7, the tape 82 has positioned thereon, a rectangular segment 350 of conductive material such as copper foil. Additionally, there are mounted on the message unit 60 along the path of tape movement, a ground brush 354 and a stepping switch brush 356. The brushes are displaced by a distance such that the foil 350 will be capable of bridging them. The effect of such bridging is to connect ground potential to the stepping brush according to the position of the tape 82. As will be shown more fully in connection with the description of the intercall sequence control, the passage of the foil 350 through the brush arrangement will cause the message unit to cease operation and ready itself for a subsequent operation.

THE MESSAGE SELECT UNIT

The purpose of the message select unit 52 is to impress a finite voltage on the burglary select line 345 whenever any of the normally opened fire alarm switches 242 are closed by the operation of their associated fire and/or smoke detecting devices 26. The purpose for this is to operate the relay coil 344 so that an immediate police department call and a burglary message will be obtained as a result of a fire condition. As indicated previously, when this coil is not energized, its associated switch contacts will remain in a position such that operation of the system will produce a fire department call and a fire message. The message select unit comprises a select unit relay coil 360 connected between ground and the select unit line 248. The coil 360 closes a pair of normally opened switch contacts 362 which serve to connect the 24 volt DC supply line 204 to the burglary select line 345. The application of the 24 volt DC potential to the select unit line 248 by operation of the door switch 242 during an attempted burglary serves to latch the coil 360 into its energized condition thus maintaining the 24 volt DC potential on the burglary select line 345 until a system reset signal occurs which causes the switch 218 in the power supply unit 62 to open and remove the 24 volt DC potential from its source.

Energization of the coil 360 additionally serves to close a pair of normally open contacts 364 which thereupon connect ground potential to a step-advance line 366 leading to the stepping switch 322 in the intercall sequence control 56. A series capacitor 368 and a shunt resistor 370 are connected in the step advance line 366 to provide a pulsing effect following closure of the contacts 364.

There are also provided a pair of normally closed fire indicator control switch contacts 372 which are opened upon energization of the coil 360. As will be seen hereinafter the opening of the contacts 372 serves to prevent illumination of the fire button 40 on the telephone 12 when the relay coil 360 is energized by the occurrence of an attempted burglary. Thus a person observing the telephone 12 will see that since the police or both the police and private agency buttons 38 and 39 are illuminated with the fire button 40 not illuminated, the system is in the process of responding to a burglary situation. On the other hand, where the emergency is a fire and the fire department will be called first, then then coil 360 will not be energized. The contacts 372 will remain closed and the fire button 40 will be illuminated thus showing the nature of the alarm sequence the system is undergoing.

THE RING BACK AND BUSY SIGNAL MONITOR

The purpose of the ring back and busy signal monitor 54 is to sequence the system so that it will place another call immediately upon failure to complete a first call. Such failure to complete a first call will occur either as a result of the telephone being called either not answering or being busy. In either situation, either a ring back signal or a busy signal will occur across the telephone line 68. Both the ring back signals and the busy signals are produced at the telephone exchange and are transmitted from the exchange back to the alarm system over the lines 68. The ring back and busy signals involve voltages which are considerably higher than the normal voice produced voltages which occur along the lines 68.

The ring-back and busy signal monitor 54 includes a pair of input lines 380 and 382 connected respectively to the branches **68*a* and 68*b* of the telephone line 68. The monitor 54 comprises a first relay coil 384 which is connected at one end to the DC voltage supply line 204 and at the other end to the emitter of a second stage transistor 386. The collector of the transistor 386 is grounded and its base terminal is connected to the collector by means of a diode 388. A filtering capacitor 390 is connected in parallel with the coil 384. There is additionally provided a first stage transistor 392 having its emitter and collector connected respectively via associated resistors 394 and 396 to the 24 volt DC supply line 204 and to ground. The emitter of the first stage transistor 392 is coupled via a capacitor 398 to the base terminal of the first of the second stage transistor 386. The base terminal of the first stage transistor 392 in turn is coupled via the wire 382 to the branch 68*b* of the telephone line 68. A voltage divider arrangement comprising a pair of resistors 400 and 402 is placed between the DC supply line 204 and ground. The junction point of this voltage divider circuit is coupled via an input capacitor 404 to the wire 380 leading to the branch 68*a* of the telephone line 68. This junction point is additionally coupled via a capacitor 406 to the collector of the first stage transistor 392**.

The first relay coil 384 is arranged to close a pair of contacts 408 which connect the 110 volt AC supply line 202 through a half wave rectifier diode 410 to an accumulator circuit shown generally at 412. The accumulator circuit 412 comprises a second relay coil 414, one end of which is connected to the other 110 volt AC supply line 200, and the other end of which is connected serially through a pair of resistors 416 and 418 to the cathode terminal of the half wave rectifier diode 410. A pair of charging capacitors 420 and 422 are also provided. One side of each of these capacitors is connected to the 110 volt AC supply line 200 while the opposite end of each capacitor is connected respectively to a different end of the second resistor 418. The second relay coil 414 is arranged to close a pair of normally opened switch contacts 424 and thereby apply ground potential to a step sequence line 426.

The ring back and busy signal monitor 54 operates in the following manner. After a call is placed by the system as described previously, the called telephone is monitored for either busy signal tones or ringing tones. Should the number of such tones exceed some predetermined limit (for example, eight), the system will consider the call as not being completable; and will then automatically sequence the system to place the next subsequent call.

The production of busy signals or ring back signals at the telephone exchange produces corresponding voltages across the telephone lines 68 which are far greater than the voltages associated with the transmission of voice signals over these lines. These high voltages are communicated via the lines 380 and 382 to the first stage transistor 392. The capacitors 404 and 406 serve to prevent DC voltages from actuating the transistor 392. However the presence of the high alternating voltages from busy or ringing signals will pass through the capacitors 404 and 406 and will cause the transistor 392 intermittently to go into its conductive state, thereby allowing current to flow through the associated emitter and collector resistors 394 and 396. As a result of the intermittent flow of current through these resistors, the voltages at the emitter of the transistor 392 will fluctuate. This fluctuating voltage is transmitted through the coupling capacitor 398 to the base terminal of the second stage transistor 386. This causes the second stage transistor 386 to conduct intermittently, thereby energizing the first relay coil 384. The parallel connected capacitor 390 will maintain the first relay coil 384 energized during the occurrence of each ringing or busy signal.

The energization of the first relay coil 384 will cause its relay contacts 408 to close for the duration of the ringing or busy signal. This in turn causes the second stage coil 414, together with the accumulator circuit 412, to be placed across the 110 volt supply lines 200 and 202. The second stage relay coil 414 however will not immediately become energized for a finite amount of time, depending upon the relative sizes of the resistors 416 and 418 and the capacitors 420 and 422 will be required before the capacitors will charge to a sufficient potential to allow energization of the second relay coil 414. On the other hand, when the relay contacts 408 are opened, the capacitors 420 and 422 will not readily lose their charge. Thus, an accumulation takes place whereby as the relay contacts 408 close a number of times, a greater and greater charge will build up on the capacitors 420 and 422 eventually becoming sufficiently large to allow energization of the second relay coil 414 and closure of its associated contacts 424. It will thus be appreciated that each ringing or busy signal produced in the telephone lines 68 will cause the accumulation of a greater voltage charge on the capacitors 420 and 422; and when the number of these rings has exceeded a predetermined amount (e.g., eight), the capacitors will charge to a value sufficient to cause energization of the second relay coil 414. This in turn will close the relay contacts 424 and will thereby apply ground potential to the step sequence line 426.

THE INTER-CALL SEQUENCE CONTROL UNIT

The purposes of the inter-call sequence control unit 56 are as follows:

a. In the event of a fire;
  - first, to call the fire department and broadcast a fire message;
  - second, to call the police department and broadcast a fire message;
  - third, to call a private agency or other private member and broadcast a fire message;
  - fourth, in the event of any incompleted call, to call the operator and broadcast a fire message;
  - fifth, to reset itself to respond to a further alarm situation.

b. In the event of an attempted burglary;
  - first, to call the police department and broadcast a burglary message;
  - second, to call a private agency or other private member and broadcast a burglary message;
  - third, in the event of any incompleted call, to call the operator and broadcast a burglary message;
  - fourth, to reset itself to respond to a further alarm situation.

As indicated previously, the inter-call sequence control 56 is provided with a stepping switch 322. This stepping switch may be of the same general type used in telephone switching arrangements at telephone exchanges. These switches, known as "MINOR" switches, usually are provided with a plurality of decks or stages, each having a number of position terminals and a wiper arm. The wiper arm in each stage is connected to a common shaft running through the switch so that each wiper arm is moved in synchronism with the others.

In the present case the switch 322 is provided with four separate stages, each having its own associated wiper arm, 430, 431, 432 and 324. Each of the wiper arms is mounted on a common shaft, shown schematically at 434. The shaft 434 is moved stepwise in a clockwise direction by successive energizations of a step relay coil 436. At any point, the shaft 434 (and the wiper arms 430, 431, 432 and 324) can be returned immediately to their starting positions by energization of a reset relay coil 438. One side of both the step relay coil 436 and the reset relay 438 is connected to the 24 volt DC supply line 204. The coils are energized by connecting their other side to ground.

As indicated previously, the fourth wiper arm 324 moves sequentially to contact each of the terminals 317, 318, 319 and 320 to successively connect the dial switches 144 associated with the different ones of the dialing code disks 132–138 into circuit across the branches 68*a* and 68*b* of the telephone line 68. Thus, the position of the fourth stage wiper arm 324 controls the particular member to be dialed.

The third stage wiper arm 432 contacts successively in each of its four stepping positions, terminals 440, 441, 442 and 443. The wiper arm, 432 is connected via either or both of a pair of sets of normally opened contacts 444 and 446 in the inter-call sequence control 64 to the 24 volt DC supply line 204. The contacts 444 and 446 are connected in parallel and are closed by energization of the relays 260 and 274 respectively so that position d-c potential will be imposed upon and will remain on the wiper arm 432 during an entire sequence of operation.

As shown in the drawing, the wiper arm 432 has attached to its tip a sectorial segment 448 of copper or other conductive material, so that as the wiper arm 432 advances, it will remain in conductive contact with each of the terminals previously contacted. The first terminal 440, is connected via the normally closed fire indicator control switch contacts 372 in the message select unit 52, to a fire indicator bulb 446 in the telephone 12 just under the fire button 40. The other side of the bulb 446 is connected to ground. Thus when the system goes into automatic operation in response to a fire, the bulb 446 will light to illuminate the fire botton 40 and this button will remain illuminated throughout the sequence. On the other hand, where the emergency situation is a burglary, then the relay 360 will become energized to open the contacts 372 and thereby prevent illumination of the fire button 40.

The second and third terminals 441 and 442 in the third stage of the stepping switch 322 are connected respectively to bulbs 450 and 451 located in the telephone 12 just under the police and private agency buttons 38 and 39 respectively. This arrangement causes these buttons to become illuminated as calls are made to their indicated stations during automatic operation.

It will be appreciated that the present system permits at a glance, complete information as to what type of emergency the system is responding to and what number or station is presently being called. The last button illuminated is, of course, that corresponding to the number of station now being called. Also if the fire button is not lit then the system is responding to a burglary, whereas if the fire button is lit then the system is responding to a fire.

The fourth stepping terminal 443 is unconnected at all times, although, if desired it could be connected as above described to signal a call to the operator.

The second stage wiper arm 431 contacts successively in each of its four stepping positions, terminals 452, 453, 454 and 455. The terminal 452 is left unconnected. The terminals 453, 454 and 455 however, are connected via associated resistors 456, 457 and 458, to a common junction 459. The junction 459 in turn is connected via a common resistor 460 to ground, and is also connected, via a pulsing capacitor 468, to initiate terminal 240 of the intra-call sequence control unit 64. The second stage wiper arm 431 is electrically connected to the DC voltage supply line 204. Additionally, the associated resistors 456, 457 and 458 have different resistance values so that as the wiper arm 431 becomes connected to the terminals 453, 454 and 455 the common junction 459 will attain different voltage levels. Thus each movement of the second stage wiper arm 431 to a different terminal causes a step-like increase in voltage at the terminal 459. This increase in voltage is transmitted through the pulsing capacitor 461 so that a current impulse is received at the initiate terminal 240 to trigger the intra-call sequence control unit into operation.

The first stage wiper arm 430 of the stepping switch 322 is arranged to step successively between terminals 463, 464, 465 and 466. The first two terminals 463 and 464 are connected to the ground side of the step relay coil 436. The fourth terminal 466, on the other hand is connected to the ground side of the release coil 438. The third terminal 465 is connected to the common terminal of a single pole double throw switch 467. The two alternate terminals of the switch 467 are connected to the ground side respectively of the step relay coil 436 and of the reset relay coil 438. The first stage wiper arm 430 is connected to receive ground potentials supplied via either the step sequence line 426 from the ring back and busy signal monitor 54 or from the stepping switch brush 356 in the message unit 60. A sequence augmentation relay coil 468 is interposed along the step sequence line 426 between the ringback and busy signal monitor 54 and the first stage wiper arm 430. This augmentation relay coil is arranged as shown to operate the switch 467 in a direction connecting it to the step relay coil 436. Also as shown in the drawing, the stepping switch 322 is constructed such that switching to a reset position will additionally serve to return the double pole switch to be connected to the reset relay coil 438. There is also provided a normally opened movably controlled reset switch 470 arranged when closed to impose ground potential on the reset relay coil 438 for resetting the system at any time.

This ground side of the step relay coil 436 is also connected to the step advance line 366 from the message select unit 52.

The inter-call sequence control unit 56 operates in the following manner:

Initially the stepping switch 322 is in the position shown and the switch 467 is in its reset relay coil connected position. Operation of the system, as previously described, occurs as a result of the application of an initiating voltage on the initiate terminal 240 of the intra-call sequence control unit 64. This as stated previously, may occur as a result of the closing of any of the switches 22, 26, 250 or 252. When this occurs the intra-call sequence control unit 64, the dial unit 58 and the message unit 60 will go into operation to place the first call. With the stepping switch 322 of the inter-call sequence control unit 64 in the position shown, the first number to be dialed would be that of the fire department. However, if the emergency situation is a burglary type then the message select until 52 will place ground potential on the step relay coil 436 for a short period of time as above described, causing the inter-call sequence control to bypass the fire department and call the police on its first call.

Upon the placement of this first call, the ringing signals and/or the busy signals which take place after dialing will be monitored by the ring back and busy signal monitor 54. Assuming that the called telephone does not answer, the ring back and busy signal monitor will close its relay contacts 424 to supply a ground potential on the step sequence line 426. This will place the stepping coil 436 in an energizing condition, so as to rotate the shaft 434 to its next position causing the wiper arms 430, 431, 432 and 324 to move to their next respective terminals 464, 453, 441 and 318.

If the called telephone does answer the message unit 60 will complete its broadcast and eventually the conductive foil segment 350 on its tape 82 will bridge the brushes 354 and 356 so as to place ground potential on the step relay coil 436 causing the system to sequence to its next call.

The sequence of calls continue as above described until the private agency call is made. After this call is placed the system will either call the operator or will omit the operator and reset itself to be ready for a new emergency situation. In the present case the criteria or deciding factor as to whether the operator should be called, is based upon whether any previously made call failed to be completed. IN such a case the sequencing would have been effected by a ground connection to the stepping relay coil 436 from the ringback and busy signal monitor 54 rather than from the message unit 60. This occurence energizes the augmentation relay coil 468 to move the switch 467 to its step relay coil contacting position so that the next ground connection obtained through the wiper arm 430 while it is in its third or private agency position will be communicated to the step relay coil 436 rather than to the reset coil 438 thereby placing a call to the operator. If on the other hand, all previous calls were completed, the switch 467 would remain in the position shown; and then after the private agency call is completed the next ground connection will be directed to the reset relay coil 467 to reset the system.

In certain situations it becomes desirable or necessary to cut in on the system while it is in operation. For example, if the system began to operate as a result of a false alarm it would be necessary to correct the situation immediately. Thus as shown in FIG. 7, the telephone handset 42 is provided with a normally closed manual override switch 472. This switch, as shown is interposed in the branch **68*b* of the telephone line 68 between the points of connection to the telephone 12 and the points of connection to the message unit 60. When the handset is picked up during an automatic sequence one can hear the alarm message being broadcast. Then by pressing the handset button to open the manual override switch 472** he can cut off the broadcast of the message without losing the called party. He may thereafter speak to the called party to correct any mistake or false alarm or to give any additional information.

Under certain circumstances it may be necessary or desirable to call the police, the fire department or a private agency directly without playing any particular message but also without having to look up and manually dial their individual numbers. This feature is achieved in the present arrangement merely by lifting the handset 42 and pressing down on the police, private agency or fire department button 38, 39 or 40. As shown in the drawing each of these buttons closes on their parallel connected trigger switches 473, 474 or 475 which serves to connect the 24 volt d-c supply line 204 to the initiate terminal 240 thus starting the system into automatic operation.

Immediately below the trigger switches 473, 474 and 475 there are provided corresponding double pole dial control switches 476, 477 and 478. These dial control switches when in the uppermost positions as shown are connected in series in one of the branches of the line 66. By moving one of these switches the line 66 is broken. However, when such dial control switch is in its switched or lowermost position it recompletes the line 66 via one of the dial switches 144 and on associated branch line 480, 481 or 482. Thus when the dial motor turns the various code disks 132–138 only one of the dial switches 144 corresponding to the depressed button will effect dialing. Moreover, there are provided associated sets of normally closed series connected switches 483, 484 and 485 which open the branch line **68*b* to disconnect the dialing circuit through the stepping switch 322** when manual operation is desired.

Also there are provided additional sets of normally closed series connected switches 485, 487 and 488 which are opened by the buttons 38, 39 and 40 respectively. These last switches are connected into the line 288 to prevent operation of the tape drive motor 106 and the local alarm 74 during manual operation.

The remote console 27 provides for initiating the telephone alarm sequence from a location remote from the telephone. In many situations, as where an intruder has already gained entry, it may be desired to set off the telephone sequence without sounding the local alarm 74, for this might cause the intruder to realize that the person whom he is breaking in on is summoning for help. Such a situation could prove very dangerous, especially if the intruder is of questionable stability. Accordingly, there are provided normally closed subswitches 490 and 491 which are operated by the fire and police buttons 27a and 27b respectively. The subswitches 490 and 491 are connected in series with each other in the line connecting the local alarm 74 into the circuit supplying the tape drive motor 106. Thus when the system is put into operation via the remote console 27 the local alarm will not be sounded.

In certain other instances there are situations where it may be desired to sound the local alarm alone, as for example where an elderly person needs to summon help from passers-by. In order to provide this facility the local alarm button **27*c* is arranged to close a normally open switch 492 which in turn connects the local alarm 24** directly across the 110 volt power supply lines.

Figure 8:
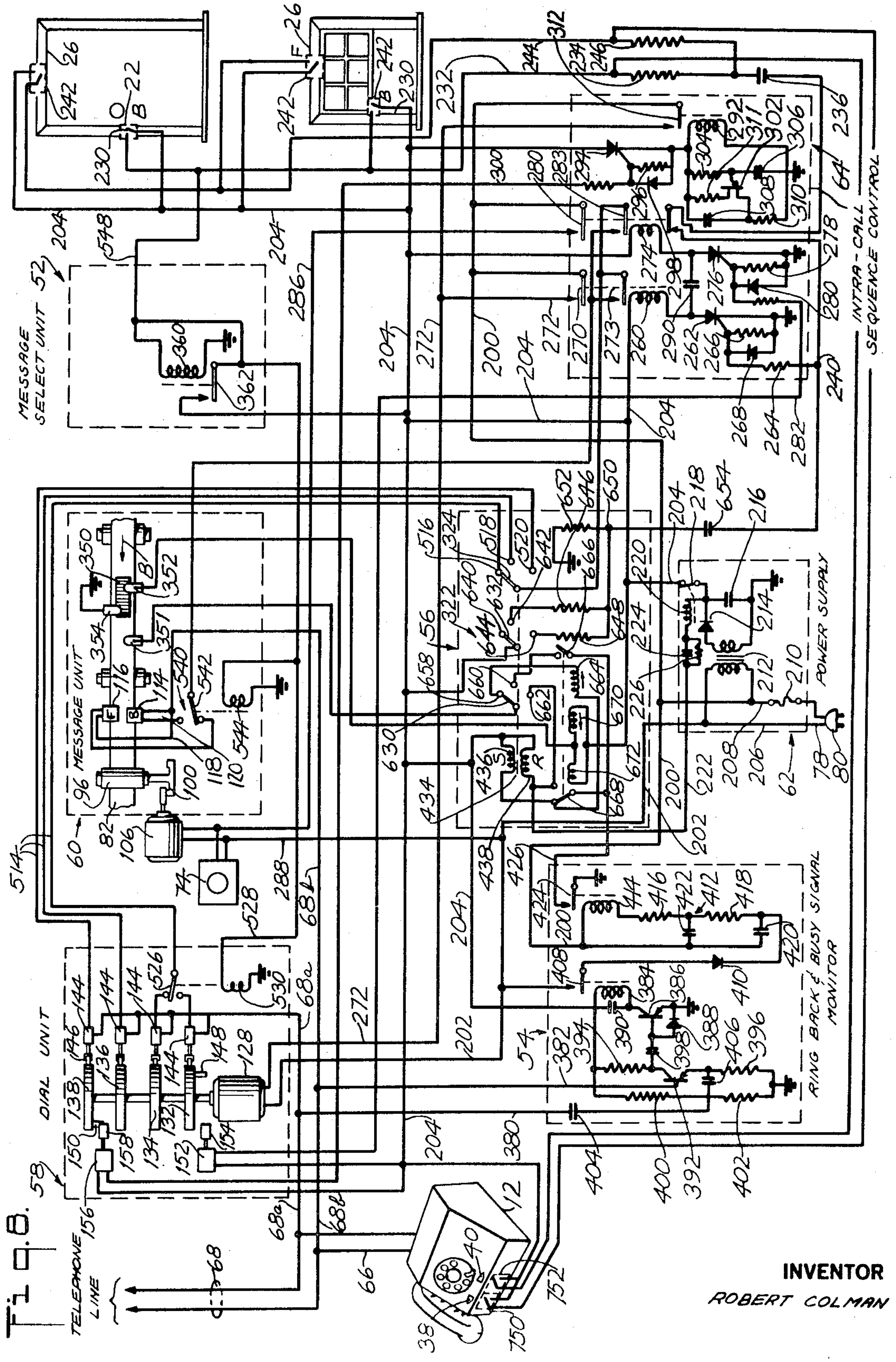
FIG. 8 is a wiring diagram similar to FIG. 7 but showing certain modifications to the system.

FIG. 8 shows an arrangement generally similar to that of FIG. 7 but modified to operate in a somewhat different manner. In the arrangement of FIG. 8 there is no remote console as such. However, the fire and police buttons 38 and 40 on the telephone 12 are arranged to close associated switches 750 and 752 which connect the 24 volt DC supply line 204 to the initiate terminal 240 to begin an automatically sequenced operation.

The system of FIG. 8 differs from that of FIG. 7 primarily in its sequence of operation and in the manner of changing this sequency during operation based on changing conditions.

The system of FIG. 8 operates:

a. to direct the system to place its first call either to the police or to the fire department according to the output from the message select unit 52;

b. to switch the system to place a second call to a private agency or some other predetermined number following the occurrence of signals indicating either that the first call could not be made or that the first call has been completed and its message delivered;

c. to direct the system to place a third call to the telephone operator if, but only if, neither of the first two calls were completed;

d. to recycle the system to its initial state upon either the completion of a call to the operator or upon completion of attempted calls to the first two numbers, assuming at least one of said calls has been completed.

As in the previously described embodiment, the inter-call sequence control unit 56 of the present embodiment is also provided with a stepping switch 322. This stepping switch however comprises three separate stages, each having its own associated wiper arms 630, 632 and 324. As shown, each of these wiper arms is mounted on a common shaft 434 which is rotated sequentially by applying pulsing energization to a stepping relay coil 436. At any point, the stepping switch 322 can be returned to its initial position with its wiper arms as shown in the drawing by applying pulse type energization to a reset coil 438. One side of both the stepping relay coil 436 and the reset coil 438 is connected to the DC supply line 204. The coils are energized by connecting their opposite sides to ground.

The third stage wiper arm 324 moves sequentially to contact each of the terminals 516, 518 and 520 to successively connect the dial switches 144 associated with different ones of the dialing code disks 132–138 into circuit across the branches 68*a* and 68*b* of the telephone line 68. Thus, the position of the third stage wiper arm 324 controls the particular number to be dialed.

The second stage wiper arm 632 contacts successively in each of its three stepping positions, terminals 640, 642 and 644. The terminal 660 is left unconnected. The terminals 642 and 644 however, are connected via associated resistors 646 and 648 to a common junction 650. The junction 650 in turn is connected via a common resistor 652 to ground, and is also connected, via a pulsing capacitor 654, to the initiate terminal 240 of the intra-call sequence control unit 64. The second stage wiper arm 632 is electrically connected to the DC voltage supply line 204. Additionally, the associated resistors 646 and 648 have different resistance values so that as the wiper arm 632 becomes connected to the terminals 642 and 644 the common junction 650 will attain different voltage levels. Thus each movement of the second stage wiper arm 632 to a different terminal causes a step-like increase in voltage at the terminal 650. This increase in voltage is transmitted through the pulsing capacitor 654 so that a current impulse is received at the initiate terminal 240 to trigger the intra-call sequence control unit into operation.

The first stage wiper arm 630 of the stepping switch 322 is arranged to step successively between terminals 658, 660 and 662. The first terminal 658 is connected via a first relay coil 664 and the stepping coil 436 to the 24 volt DC supply line 204. The third terminal 662, on the other hand is connected via the release coil 438 to the DC voltage supply line 204. The second or middle terminal 660 is connected through a pair of single pole switch contacts 666 and the movable arm of a double pole switch arrangement 668 to be connected via either the stepping coil 436 or the relay coil 438, to the 24 volt DC supply line 204. The first stage wiper arm 630 is connected to receive ground potentials supplied via a stepping switch brush 351 in the message unit 60. The switch contacts 666 are arranged to be controlled by energization of the first relay coil 664 and a second relay coil 670. Energization of the first relay coil 664 causes the switch contacts 666 to open. These contacts will remain open until energization of the second relay coil 670. Additionally, the movable arm 668 is normally biased to remain in its stepping coil contacting position as shown but will be switched upon energization of a third relay coil 672 to a reset coil contacting position. Operation of the release coil 438, in addition to causing the shaft 424 to swing its respective wiper arms 630, 632 and 324 to their first step positions as shown, also causes the movable arm 668 to return to its stepping coil contacting position as shown. The second and third relay coils are connected in parallel between the 24 volt DC supply line 204 and the reset brush 352 in the message unit 60. Thus when the foil segment 350 on the tape 82 bridges the brush 352 and the ground connected brush 354, the second and third relay coils 670 and 672 will become energized to actuate their respective switches 666 and 668 to the positions opposite that shown in the drawings.

The inter-call sequence control unit 56 operates in the following manner:

Initially the stepping switch 322 is in the position shown and the movable arms 666 and 668 of the other switch contacts are in their positions as shown in the drawings. Operation of the system, as in the embodiment, occurs as a result of the application of an initiating voltage on the initiate terminal 240 of the intra-call sequence control unit 64. This may occur as a result of the closing of any of the switches 22, 26, 750 or 752. When this occurs the intra-call sequence control unit 64, the dial unit 58 and the message unit 60 will go into operation to place the first call. With the stepping switch 322 of the inter-call sequence control unit 64 in the position shown, the first number to be dialed would be that of either the police or fire department, depending upon whether the message select unit 52 has been energized as will be described hereinafter.

Upon the placement of this first call, the ringing signals and/or the busy signals which take place after dialing will be monitored by the ring back and busy signal monitor 54. Assuming that the called telephone does not answer, the ring back and busy signal monitor will close its relay contacts 624 to supply a ground potential on the step sequence line 626. This will place the stepping coil 636 in an energizing condition, so as to rotate the shaft 634 to its next position causing the wiper arms 630, 632 and 324 to move to their next respective terminals 660, 642 and 518. In this second position, the first stage wiper arm 630 does not produce any action since the switch contacts 646 are in their opened condition. The movement of the second stage wiper arm 632 to the terminal 642 however causes the application of positive voltage from the DC supply line 204 to proceed through the resistor 646 to the common junction 650 thereby causing a voltage step which passes through the pulsing capacitor 654 to oppose a new initiate voltage on the initiate terminal 240 of the inter-call sequence control unit 64. As a result of this, a second call is initiated by this unit. The dialing of the second call however will be directed to a new number since the third stage wiper arm 324 has moved to its terminal 518 which connects a different one of the dial switches 144 into circuit across the telephone line 68. After this second call has been dialed the ring back and busy signal monitor reacts to ringing signals and/or busy signals and assuming that the call is not completed, (either to the called telephone being busy or due to its not being answered), the ring back and busy signal monitor 54 will again close the switch contacts 436 to apply ground potential to the step sequence line 426. This again then places the stepping coil 436 across the ground connection supplied through the line 426 and the 24 volt DC supply line 204. AS a result, the stepping coil 436 will turn the common shaft 434 so as to bring its associated wiper arms 630, 632 and 324 to their third position terminals 662, 644 and 520.

The case where the first call has been completed and when the second call is not completed, will now be considered.

The stepping switch 322 is in the position shown in FIG. 7 during the placement of a first call. Assuming this call is completed, then no ground connection will be supplied over the step sequence line 426. Instead, the message unit 60 will complete the play of the tape 82 bringing it through a complete circuit. Toward the end of this circuit the foil segment 350 on the tape 82 will bridge the ground connected brush 354 and the reset brush 352. When this occurs, the second and third relay coils 670 and 672 will be energized thereby closing the switch contacts 666 and bringing the other switch contact 668 into reset coil connecting position. Shortly thereafter the foil segment 350 will bridge the ground connected brush 354 and the stepping switch brush 356. When this occurs, the first stage wiper arm 630 connects ground potential via its first terminal 658 through the first relay coil 664 and through the stepping coil 436 to the 24 volt DC supply line 204. This simultaneously causes the stepping switch 322 to move its wiper arms 630, 632 and 324 to their second position terminals 660, 642 and 518 respectively. At the same time, the energization of the first relay coil 664 causes the switch contacts 666 to open so that when the first wiper arm 630 becomes connected to its second terminal 660, ground potential will not thereby be supplied again to the stepping coil 436. The movement of the second stage wiper arms 632 to the contact terminal 642 initiates the second call. Should this call be incomplete due to an excessive number of signals or ring back tones, ground potential will be supplied through the ring back and busy signal monitor switch contacts 424 and the double pole reset contacts 668 to the reset coil 438 thereby resetting the system to its initial starting condition. On the other hand, should the second call be completed, then the foil segment 350 on the tape 82 will again first bridge the brushes 352 and 354 to apply ground potential for energization of the second and third relay coils 670 and 672 thereby closing the switch contacts 466 and leaving the switch contacts 668 in their reset coil connecting condition. Shortly thereafter the foil segment 350 will bridge the brushes 354 and 356 thereby supplying ground potential to the second stage wiper arm 630. This wiper arm is now connected to the second stage terminal 660 and thereby supplied ground potential through this terminal and through the now closed switch contacts 666, through the reset coil connected contact 668 to the reset coil thereby causing the stepping switch 322 to be reset to its initial position. The situation where the first call is not completed but the second call is completed as can be seen, also produces the results described above.

It will additionally be noted that the reset line 222 is connected to the ground side of the reset coil 438; so that whenever this coil is reset, ground potential will at the same time be supplied to the reset line 222 for energization of the reset relay 220, thereby to remove the 24 volt DC supply line 204 from the power supply unit 62. This permits all of the relays in the system to return to their de-energized state thereby causing the system to revert to its normal condition. Soon thereafter, the switch contacts 218 reclose placing the system in condition for monitoring a further emergency.

The second stage wiper arm 632 in moving to the terminal 644 places the 24 volt DC supply line 204 into connection with the associated resistor 648 to the common junction 650. The resistance value of the resistor 648 being less than that of the resistor 646, the voltage at the junction 650 increases suddenly as a result of the movement of the wiper arm 642 to the terminal 644. This sudden rise in voltage is communicated via the pulsing capacitor 654 to the initiate terminal 240 of the intro-call sequence control unit 64 thereby initiating the start of a third call.

At the same time, the third stage wiper arm 324 of the stepping switch 322 has been moved to its third terminal position 520 thereby to connect the uppermost dial switch 144 into circuit across the telephone lines 68 so that the dialed call will be placed to the operator.

The operator can be expected to answer the call and therefor the message unit 60 will have an opportunity to broadcast its message. Assuming that the operator does not answer even after the duration of eight rings, the ring back and busy signal monitor 54 will again energize the stepping coil 436. However with the stepping coil shaft 434 already in its third and last position, the ringback and busy signal monitor will have no effect and the message unit 60 will continue to function and play its message.

Upon completion of the message from the message unit 60, the foil segment 350 on the tape 82 will first pass between the reset brush 352 and the ground brush 354 thus placing the second and third coils 670 and 672 between the 24 volt DC supply lines 204 and ground potential. This will energize the coils 670 and 672 causing the switch contacts 666 to close and the switch contacts 668 to move to their reset position. Shortly thereafter, the foil segment 350 will bridge the ground connected brush 354 and the stepping switch brush thereby placing ground potential upon the first stage wiper arm 630. Since the arm 630 is at this time connected to the third position terminal 662, ground potential will be applied to the reset coil 438 causing the system to revert back to its initial condition with the wiper arms assuming their uppermost positions as shown.

If either the first or second attempted calls is completed, this system will revert back to initial condition without placing a call to the operator after having attempted and/or completed its second call.

As indicated above, the system of FIG. 8 is arranged to place a call to the fire department only in the event of a fire; and to place a call to the police department only in the case of a burglary type emergency.

In order to provide for this, the outputs of the two switches 144 associated with the fire and police coded code disks (i.e. the two lowermost disks) are connected to alternate terminals of a double pole switch 526. The switch 526 is normally in its police call position as shown but is switchable by means of a fire call relay coil 530. The relay coil 530 is energized by application of voltage thereto over a fire select line 531 from the message select unit 52.

The message select unit 52 differs from its counterpart in FIG. 7 in that it is energized by the occurrence of a fire alarm rather than by a burglary alarm. Thus the coil 360 is connected to be energized through the line 548 which now is connected with the fire switches 242. Energization of the coil 360 closes the latching switch contacts 362 and imposes positive DC potential on the fire select line 531.

This is additionally provided a message select coil 544 in the message unit 60 which is also connected to be energized from the fire select line 351 and is arranged when energized, to operate a switch 540 to connect the fire pickup head 116 into the telephone line 68.

It will be appreciated that the system of the present invention is extremely flexible and can be modified for any desired set of conditions. For example, different types of emergency situations can be programmed into the system and telephone calls to different localities can be placed. Additionally, the number of calls to be produced as a result of any given emergency situation can be altered, and quite importantly, the sequence of placement of such calls can be altered during operation of the system based upon the response received from the calls being placed.

Having thus described the invention with particular reference to the preferred form thereof, it will be obvious to those skilled in the art to which the invention pertains, after understanding my invention, that various changes and modifications may be made therein without departing from the spirit and scope of the invention, as defined by the claims appended thereto.

What is claimed as new and desired to be secured by Letters Patent is:

1. A telephone system comprising a plurality of dialing means each arranged to dial a different number, sequencing means for successively connecting different ones of said dialing means into a telephone line to dial their respective numbers, monitoring means arranged to be connected to said telephone line and responsive to the occurrence on said line of ringback and busy signal voltages, said monitoring means including counter means for producing an output upon the accumulation of a predetermined number of such signal voltages following each dialing operation, and means for controlling the operation of said sequencing means in response to said output.

2. A telephone system as in claim 1 wherein said sequencing means operates to initiate the dialing of a different number in response to the application thereto of a given potential, and wherein said monitoring means includes means for producing said potential at its output.

3. A telephone system as in claim 1 wherein said monitoring means includes an output relay, a set of output relay operated switch contacts connected respectively to a source of said potential and to said sequencing means, and means for operating said relay upon the accumulation in said monitoring means of said predetermined number of signal voltages.

4. A telephone system as in claim 3 wherein said monitoring means includes an additional relay connected and biased to be energized during the occurence on said telephone line of each of said signal voltages, a pair of additional relay contacts arranged to be closed by the energization of said additional relay, and an accumulator circuit connected to receive energization from an electrical source during the closure of said additional relay contacts, the output of said accumulator circuit being connected to energize said output relay.

5. A telephone system as in claim 4 wherein said accumulator circuit comprises a plurality of series connected resistors interspersed with parallel connected capacitors.

6. A telephone system as in claim 1 wherein said sequencing means comprises a stepping switch having a plurality of position terminals each connected to a different one of said dialing means, said stepping switch further having a wiper arm and a stepping coil, said stepping coil being arranged upon energization to move said wiper arm from one of said terminals to the next.

7. A telephone system as in claim 6 wherein said stepping coil is connected to be energized by outputs from said monitoring means.

8. A telephone system as in claim 1 wherein said dialing means each comprise a dial switch and an associated code disk having groups of protrusions for opening and closing the dial switch during rotation of the code disk, one contact of each of said dial switches being arranged to be connected to one side of a telephone line, the other contact of each of said dial switches being connected to one of said position terminals in said sequencing means.

9. A telephone system as in claim 6 wherein said wiper arm is arranged to be connected via an audio signal generator to the other side of said telephone line.

10. In a telephoning system, a code disk having a plurality of groups of protrusions displaced thereabout and corresponding to the digits of a telephone number to be dialed, a dial switch arranged to be opened and closed by the movement of said protrusions thereby as said disk rotates, said dial switch being connectable into a telephone line, an electrically driven code disk drive motor, an intra-call sequence control unit comprising a plurality of relays and switch contacts controlled thereby, first and second sets of said contacts being controlled respectively by first and second ones of said relays, said first and second sets of contacts being arranged in parallel with each other between said drive motor and an electrical power source to produce operation of said motor when their associated relay is energized, means for energizing said first relay in response to a trigger signal input, means for energizing said second relay in response to the movement of said code disk from its initial position to a given rotational position following energization of said first relay, means for deenergizing said first relay in response to the movement of said code disk beyond said given rotational position, and timer means triggered by energization of said second relay and operative to maintain said second relay energized for a period of time sufficient to return said code disk to its said initial position.

11. A telephone system as in claim 10 wherein said means for deenergizing said first relay comprises means for initiating the application of voice signals to said telephone line.

12. A telephone system as in claim 10 wherein said first relay comprises a relay coil and a thyristor connected in series across a pair of voltage supply lines, the control electrode of said thyristor being connected to receive said trigger signal input to switch said thyristor to its conductive state.

13. A telephone system as in claim 12 wherein said second relay comprises a relay coil, a thyristor and said timer means connected in series across said voltage supply line.

14. A telephone system as in claim 13 wherein said means for deenergizing said first relay comprises a third relay coil and associated thyristor connected in series across a pair of voltage supply lines, the junction point of said third relay coil and its thyristor being capacitively coupled to the junction point of said first relay coil and its associated thyristor.

15. A telephone system as in claim 14 wherein said first and third relay coils are provided with normally open parallel connected switch contacts arranged to be connected to a telephone line for maintaining an off hook condition during energization of at least one of said first and third relays.

16. In a telephoning system a dialing apparatus capable of automatically dialing a plurality of numbers, a sequence control apparatus connected to said dialing apparatus and operative to cause said dialing apparatus to dial said numbers individually according to a given sequence, a ringback and busy signal monitor arranged to be connected across the telephone lines on which said dialing apparatus operates, said ringback and busy signal monitor being operative in response to a predetermined number of voltage occurrences on said telephone lines caused by ringback and busy signals following operation of said dialing apparatus to trigger said sequence control apparatus in a manner causing it to switch said dialing apparatus to dial the next successive number in said given sequence.

17. A telephoning system as in claim 16 wherein said system includes a message broadcast means operable to trigger said sequence control apparatus upon completion of a message following dialing.

18. A telephoning system as in claim 16 wherein said sequence control apparatus is arranged to respond to said triggering signals to augment said given sequence.

19. A telephoning system as in claim 18 wherein said sequence control apparatus is arranged to augment said given sequence by adding additional calls thereto.

20. A telephoning system as in claim 19 wherein said sequence control apparatus is arranged to effect said augmentation upon the occurrence of triggering from said ringback and busy signal monitor following any one of the calls in said given sequence.

21. A telephoning system as in claim 19 wherein said sequence control apparatus is arranged to effect said augmentation upon the occurrence of triggering from said ringback and busy signal monitor following all of the calls in said given sequence.

22. A telephoning system as in claim 16 wherein said dialing apparatus includes a plurality of dial switch means each programmed to interrupt a circuit in accordance with a particular telephone number to be called, and wherein said sequence control means is arranged to connect individual ones of said switch means successively into said circuit.

23. A telephoning system as in claim 22 wherein said sequence control means comprises a stepping switch arranged to connect said dial switch means individually into said circuit.

24. A telephoning system as in claim 23 wherein said stepping switch is arranged to be stepped by triggering signals from said trigger signal producing means.

25. A telephoning system as in claim 24 wherein there are provided further stepping signal producing means operative in response to the completion of a telephone message to step said stepping switch.

26. A telephoning system as in claim 25 wherein there is provided further switching means operative in response to signals from said trigger signal producing means, said further switching means being connected to change the switching pattern of said stepping switch.

27. A telephoning system as in claim 22 wherein said system further includes individual manual override switch means each arranged to connect a different one of said dial switch means into said circuit in a manner bypassing said stepping switch.

28. A telephoning system as in claim 16 further including indicator means comprising lights which correspond to each of said plurality of numbers and indicator switch means arranged to turn on each of said lights as its corresponding number is called.

29. A telephoning system as in claim 28 wherein said means arranged to turn on said lights in constructed in a manner such that each light once illuminated, remains illuminated through the remainder of said sequence.

30. A telephoning system as in claim 16 wherein said telephoning system includes initiate means responsive to the occurrence of different initiating conditions to start a different given sequence.

* * * * *